(12) United States Patent
Shibuno (10) Patent No.: US 9,794,487 B2
(45) Date of Patent: Oct. 17, 2017

(54) IMAGING DEVICE, CAMERA BODY, AND METHOD FOR CONTROLLING IMAGING DEVICE

(71) Applicant: PANASONIC CORPORATION, Osaka (JP)

(72) Inventor: Koji Shibuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 14/223,309

(22) Filed: Mar. 24, 2014

(65) Prior Publication Data

US 2014/0293108 A1 Oct. 2, 2014

(30) Foreign Application Priority Data

Mar. 26, 2013 (JP) ................................ 2013-063473
Oct. 3, 2013 (JP) ................................ 2013-208001

(51) Int. Cl.
*H04N 5/232* (2006.01)
*G03B 17/04* (2006.01)
*H04N 21/432* (2011.01)

(52) U.S. Cl.
CPC ......... *H04N 5/23293* (2013.01); *G03B 17/04* (2013.01); *H04N 5/23203* (2013.01); *H04N 5/23245* (2013.01); *H04N 21/4325* (2013.01)

(58) Field of Classification Search
CPC ............. H04N 5/23293; H04N 5/2254; H04N 21/4325
See application file for complete search history.

(56) References Cited

U.S. PATENT DOCUMENTS

| 5,546,147 | A  | * | 8/1996  | Baxter et al. .................. 396/349 |
| 2002/0196357 | A1 | * | 12/2002 | Battles et al. ........... 348/333.01 |
| 2005/0168586 | A1 | * | 8/2005  | Tsubusaki ................ 348/208.99 |
| 2010/0073549 | A1 | * | 3/2010  | Sekine .......................... 348/345 |
| 2012/0098992 | A1 | * | 4/2012  | Hosoe ........................ 348/222.1 |

FOREIGN PATENT DOCUMENTS

JP 10-020175 A 1/1998

* cited by examiner

*Primary Examiner* — Ahmed A Berhan
(74) *Attorney, Agent, or Firm* — McDermott Will Emery LLP (57) ABSTRACT

An imaging device includes an imaging unit that captures light which is formed into an image through an optical system capable of housing a lens with operating force by a user; an operating unit operated by the user; a display unit that displays an image; and a controller that is capable of setting a playback mode which is an operating mode to display on the display unit an image represented by image data stored in a storage medium, and an operating mode other than the playback mode, and that sets the playback mode when the lens is housed, regardless of whether or not operation to set the playback mode has been accepted through the operating unit.

9 Claims, 5 Drawing Sheets

IMAGING DEVICE, CAMERA BODY, AND METHOD FOR CONTROLLING IMAGING DEVICE

RELATED APPLICATIONS

This application claims the benefit of Japanese Application No. 2013-208001, filed on Oct. 3, 2013 and Japanese Application No. 2013-063473, filed on Mar. 26, 2013, the disclosures of which Applications are incorporated by reference herein.

BACKGROUND OF THE INVENTION

1. Field of the Invention

The present disclosure relates to an imaging device, a camera body, and a method for controlling an imaging device.

2. Description of the Related Art

Unexamined Japanese Patent Publication No. H10-20175 discloses a retractable interchangeable lens barrel. In the retractable interchangeable lens barrel, a zoom ring rotation direction for placing the retractable interchangeable lens barrel in a retracted state from a ready-to-shoot state is made the same as a rotation direction for removing the retractable interchangeable lens barrel from a camera body. In addition, in the retractable interchangeable lens barrel, a zoom ring rotation direction for placing the retractable interchangeable lens barrel in the ready-to-shoot state from the retracted state is made the same as a rotation direction for attaching to the camera body the retractable interchangeable lens barrel.

By this, the retractable interchangeable lens barrel can be removed from the camera body by rotating an operating ring to place the retractable interchangeable lens barrel in a retracted state and then further continuously rotating the operating ring in the same direction. In addition, when the retractable interchangeable lens barrel is attached to the camera body, by continuously rotating the operating ring in the same direction, the retractable interchangeable lens barrel is placed in a ready-to-shoot state.

SUMMARY OF THE INVENTION

The present disclosure provides an imaging device, a camera body, and a method for controlling an imaging device that perform control more convenient to a user, according to the housing state of a lens in an optical system capable of housing the lens with operating force by a user.

An imaging device of the present disclosure includes: an imaging unit that captures light formed into an image through an optical system capable of housing a lens with operating force by a user; an operating unit operated by the user; a display unit that displays an image; and a controller that is capable of setting a playback mode and an operating mode other than the playback mode and that sets the playback mode when the lens is housed, regardless of whether or not operation to set the playback mode has been accepted through the operating unit, the playback mode being an operating mode to display on the display unit an image represented by image data stored in a storage medium.

In addition, a camera body of the present disclosure includes: an imaging unit that captures light formed into an image through an interchangeable lens capable of housing a lens with operating force by a user; an operating unit operated by the user; a display unit that displays an image; and a controller that is capable of setting a playback mode and an operating mode other than the playback mode and that sets the playback mode when the lens in the interchangeable lens is housed, regardless of whether or not operation to set the playback mode has been accepted through the operating unit, the playback mode being an operating mode to display on the display unit an image represented by image data stored in a storage medium.

In addition, a method for controlling an imaging device of the present disclosure is a method for controlling an imaging device that includes: an imaging unit capturing light, the light being formed into an image through an optical system capable of housing a lens with operating force by a user; an operating unit operated by the user; and a display unit displaying an image, and that can be set to a playback mode and an operating mode other than the playback mode, the playback mode being an operating mode to display on the display unit an image represented by image data stored in a storage medium, the method including: setting the playback mode when the lens is housed, regardless of whether or not operation to set the playback mode has been accepted through the operating unit.

According to the present disclosure, an imaging device, a camera body, and a method for controlling an imaging device can be provided that perform control more convenient to a user, according to the housing state of a lens in an optical system capable of housing the lens with operating force by a user.

DETAILED DESCRIPTION OF THE INVENTION

Embodiments will be described in detail below with reference to the drawings as necessary. Note, however, that a needlessly detailed description may be omitted. For example, a detailed description of already well-known matters and an overlapping description of substantially the same configuration may be omitted to avoid the following description from becoming unnecessarily redundant and facilitate understanding by those skilled in the art.

Note that the inventor(s) provides the accompanying drawings and the following description to allow those skilled in the art to thoroughly understand the present disclosure, and thus, the claimed subject matter is not intended to be limited thereby.

(First Embodiment)

A first embodiment will be described below with reference to the drawings.

[1. Summary]

Figure 1:
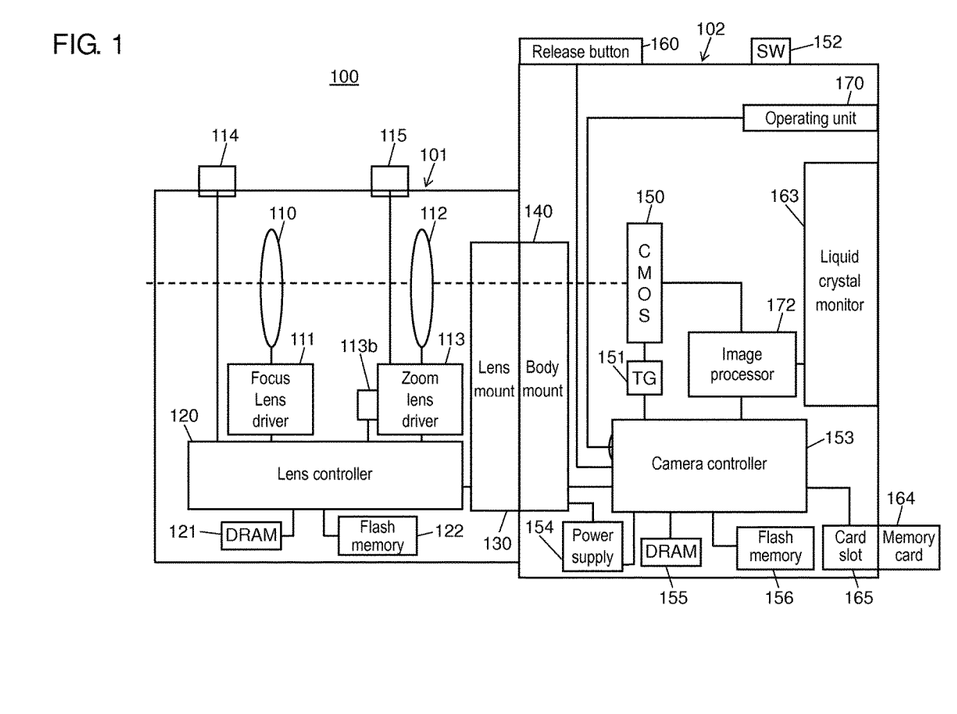
FIG. 1 is a block diagram showing an electrical configuration of digital camera 100.

A summary of digital camera 100 according to the present embodiment will be described with reference to FIG. 1. FIG. 1 is a block diagram showing a configuration of digital camera 100.

Digital camera 100 includes camera body 102 and interchangeable lens 101 which is removable from camera body 102. Interchangeable lens 101 includes at least a holding frame (not shown) that holds lenses; and a drive frame that allows the holding frame to move back and forth along an optical axis of interchangeable lens 101. In interchangeable lens 101, the holding frame can extend from the drive frame. In addition, in interchangeable lens 101, the holding frame can be housed in the drive frame.

Interchangeable lens 101 includes zoom lens 112, zoom lens driver 113, and zoom ring 115. When the holding frame containing zoom lens 112 is located nearer to the side of camera body 102 than a predetermined position on the optical axis of interchangeable lens 101, interchangeable lens 101 cannot form a subject image on CMOS image sensor 150. This state can be said to be a retracted state of interchangeable lens 101, the retracted state being a state in which the holding frame containing lenses such as zoom lens 112 are housed. In the retracted state, the holding frame is housed in the drive frame. When the holding frame containing zoom lens 112 is located nearer to the subject side than the predetermined position on the optical axis of interchangeable lens 101, interchangeable lens 101 can form a subject image on CMOS image sensor 150. This state can be said to be a ready-to-shoot state of interchangeable lens 101. In the ready-to-shoot state, the holding frame extends from the drive frame.

When a user performs rotation operation of zoom ring 115, a force caused by the rotation operation is mechanically transmitted through zoom lens driver 113 to the holding frame containing zoom lens 112. Zoom lens driver 113 is formed of, for example, a cam mechanism. When the force caused by the rotation operation is transmitted, the holding frame containing zoom lens 112 moves along the optical axis of interchangeable lens 101. By the user performing rotation operation of zoom ring 115, interchangeable lens 101 transitions between the retracted state and the ready-to-shoot state. That is, interchangeable lens 101 can be said to be a manual retractable lens that allows the user to manually extend or retract a lens.

In digital camera 100 including such a manual retractable lens, even if digital camera 100 is set to a shooting mode, digital camera 100 cannot perform shooting of a subject as long as interchangeable lens 101 is in a retracted state. This is because, as described above, interchangeable lens 101 cannot form a subject image on CMOS image sensor 150 as long as interchangeable lens 101 is in a retracted state. It is not so user friendly to set the operating mode of digital camera 100 to the shooting mode despite the fact that shooting cannot be performed.

In view of this, digital camera 100 includes CMOS image sensor 150, operating unit 170, liquid crystal monitor 163, and camera controller 153. CMOS image sensor 150 captures light which is formed into an image through interchangeable lens 101 capable of housing a lens with operating force by the user. Operating unit 170 is operated by the user. Liquid crystal monitor 163 displays images. Camera controller 153 can set digital camera 100 to a playback mode which is an operating mode to display on liquid crystal monitor 163 images represented by image data stored in memory card 164, and an operating mode other than the playback mode. When the lens in interchangeable lens 101 is housed, camera controller 153 sets digital camera 100 to the playback mode regardless of whether or not operation to set the playback mode has been accepted through operating unit 170.

By this, digital camera 100 can perform control more convenient to the user, according to the housing state of a lens in an optical system capable of housing the lens with operating force by the user.

The configuration and operation of digital camera 100 will be described in detail below.

[2. Configuration of Digital Camera 100]

A configuration of digital camera 100 will be described with reference to FIG. 1. As described above, digital camera 100 includes interchangeable lens 101 and camera body 102.

[2-1. Configuration of Camera Body 102]

Camera body 102 includes CMOS image sensor 150, liquid crystal monitor 163, image processor 172, timing generator (TG) 151, power switch 152, camera controller 153, body mount 140, release button 160, operating unit 170, power supply 154, DRAM 155, flash memory 156, and card slot 165.

Camera controller 153 controls the overall operation of digital camera 100 by controlling each unit such as CMOS image sensor 150, according to an instruction from an operating member such as release button 160 or operating unit 170. Camera controller 153 transmits a vertical synchronizing signal to timing generator 151. In parallel with this, camera controller 153 generates an exposure synchronizing signal, based on the vertical synchronizing signal. Camera controller 153 repeatedly and periodically transmits the generated exposure synchronizing signal to lens controller 120 through body mount 140 and lens mount 130. By this, camera controller 153 can control lenses such as focus lens 110 in interchangeable lens 101, in synchronization with exposure timing. Camera controller 153 uses DRAM 155 as a working memory upon control operation and image processing operation. Camera controller 153 may be composed of a hard-wired electronic circuit or may be composed of a microcomputer using a program, etc. Alternatively, camera controller 153 may be composed of the same semiconductor chip as that of image processor 172 and DRAM 155 or may be composed separately therefrom.

CMOS image sensor 150 is configured to include a light-receiving element, an AGC (Auto Gain Controller), and an AD converter. The light-receiving element converts an optical signal which is obtained by collecting light by interchangeable lens 101 into an electrical signal, thereby generating image data. The AGC amplifies the electrical signal outputted from the light-receiving element. The AD converter converts the electrical signal outputted from the AGC into a digital signal. CMOS image sensor 150 operates at timing controlled by timing generator 151. The operation of CMOS image sensor 150 controlled by timing generator 151 includes still-image capturing operation, through-image capturing operation, data transfer operation, electronic shutter operation, etc. A through-image is mainly a moving image and is displayed on liquid crystal monitor 163 to determine a composition for capturing a still image. Image information generated by CMOS image sensor 150 is supplied to image processor 172. Note that instead of CMOS image sensor 150, other imaging devices such as an NMOS image sensor and a CCD image sensor may be used.

Image processor 172 performs predetermined image processing on image data which is converted into a digital signal by the AD converter in CMOS image sensor 150. The predetermined image processing is considered to include a gamma correction process, a white balance correction process, a flaw correction process, a YC conversion process, a digital zoom process, a compression process, a decompression process, etc., but is not limited thereto.

Liquid crystal monitor 163 is a display unit disposed on the back of camera body 102. Liquid crystal monitor 163 displays images represented by display image data which is processed by image processor 172. Liquid crystal monitor 163 can selectively display a moving image and a still image. In addition to images, liquid crystal monitor 163 can display information such as the set conditions of digital camera 100. Although in the present embodiment liquid crystal monitor 163 is shown as an example of the display unit, the display unit is not limited thereto. For example, an organic EL display may be used as the display unit.

Flash memory 156 functions as an internal memory for storing image data, etc. In addition, flash memory 156 saves a program and parameters which are used when camera controller 153 performs control.

Card slot 165 is a connecting means which can allow memory card 164 to be placed in camera body 102. Card slot 165 can allow memory card 164 to be electrically and mechanically connected thereto.

Memory card 164 is an external memory including therein a storage device such as a flash memory. Memory card 164 can store data such as image data processed by camera controller 153. In addition, memory card 164 can output data such as image data stored therein. Image data read from memory card 164 is processed by camera controller 153 and image processor 172 and then is outputted to, for example, liquid crystal monitor 163. Although in the present embodiment memory card 164 is shown as an example of the external memory, the external memory is not limited thereto. For example, a storage medium such as a hard disk can also be used as the external memory.

Body mount 140 can be mechanically and electrically connected to lens mount 130 (described later) of interchangeable lens 101. Body mount 140 can transmit and receive data between camera body 102 and interchangeable lens 101 through lens mount 130. Body mount 140 transmits an exposure synchronizing signal and other control signals which are received from camera controller 153, to lens controller 120 through lens mount 130. In addition, body mount 140 transmits signals received from lens controller 120 through lens mount 130, to camera controller 153.

Power supply 154 supplies power for driving digital camera 100. Power supply 154 may be, for example, a dry battery or a rechargeable battery. Alternatively, power supply 154 may be implemented by supplying power supplied from an external source by a power cord, to digital camera 100. The power to digital camera 100 is turned on/off by power switch 152. When power switch 152 is turned on, camera controller 153 controls power supply 154 to supply power to each unit in camera body 102. In addition, camera controller 153 controls power supply 154 to also supply power to interchangeable lens 101 through body mount 140 and lens mount 130. Then, in interchangeable lens 101, power is supplied to each unit in interchangeable lens 101 by lens controller 120 (described later).

Release button 160 accepts user operation for a shooting instruction or an autofocus instruction. Release button 160 can accept two levels of operation, a half press and a full press, from the user. By user's half-press operation of release button 160, camera controller 153 performs autofocus operation. By user's full-press operation of release button 160, camera controller 153 records image data generated according to the timing of the full-press operation, in memory card 164.

Operating unit 170 includes a cross button capable of instructing operation in up, down, left, and right directions, and a mode switch button for switching the operating mode of digital camera 100 between the shooting mode and the playback mode. Camera controller 153 performs overall control to switch the operating mode of digital camera 100 between the shooting mode and the playback mode, based on user operation of the mode switch button.

[2-2. Configuration of Interchangeable Lens 101]

Interchangeable lens 101 includes focus lens 110, focus lens driver 111, focus ring 114, zoom lens 112, zoom lens driver 113, zoom lens position detector 113b, zoom ring 115, lens controller 120, DRAM 121, flash memory 122, and lens mount 130.

Lens controller 120 controls the overall operation of interchangeable lens 101. Lens controller 120 may be composed of a hard-wired electronic circuit or may be composed of a microcomputer using a program, etc.

DRAM 121 functions as a working memory used when lens controller 120 performs control. Flash memory 122 saves a program, parameters, lens data, etc., which are used when lens controller 120 performs control. Here, the lens data includes characteristic values specific to interchangeable lens 101, such as lens name, lens ID, serial number, F-number, focal length, whether there is power zoom function, and resolution characteristic information. As will be described later, lens controller 120 notifies camera controller 153 of the lens data, and camera controller 153 can perform various control operation according to the lens data.

Zoom lens 112 can move on the optical axis of the optical system. Zoom lens 112 changes the magnification of a subject image formed by the optical system, by being allowed to move on the optical axis of the optical system. The lens configuration of zoom lens 112 may include any number of lenses or may include any number of groups of lenses.

Zoom lens driver 113 is a mechanical mechanism that allows zoom lens 112 to move along the optical axis of the optical system, based on user's rotation operation of zoom ring 115. Zoom lens driver 113 allows zoom lens 112 to move by mechanically transmitting a force caused by rotation of zoom ring 115, to zoom lens 112. As described above, a state in which the optical system of interchangeable lens 101 holds zoom lens 112 within a range where a subject image can be formed on an imaging surface of CMOS image sensor 150 in camera body 102 is referred to as a ready-to-shoot state. When rotation operation is further performed on zoom ring 115 by the user in a state in which zoom lens 112 is located nearest to the side of camera body 102 in the ready-to-shoot range, zoom lens driver 113 allows zoom lens 112 to move to the side of camera body 102 beyond the ready-to-shoot range. At this time, the holding frame for the lenses also moves to the side of camera body 102, together with zoom lens 112. In this case, the holding frame which holds zoom lens 112 is housed in the aforementioned drive frame. By the holding frame thus retracted into interchangeable lens 101, interchangeable lens 101 transitions to a retracted state which is a state in which the overall length of interchangeable lens 101 in an optical-axis direction is shorter than that in a ready-to-shoot state.

A position of zoom lens 112 is detected by zoom lens position detector 113b whenever necessary, and is notified to lens controller 120.

Focus lens 110 can move on the optical axis of the optical system. Focus lens 110 changes the focus state of a subject image formed on CMOS image sensor 150, by being allowed to move on the optical axis of the optical system. The lens configuration of focus lens 110 may include any number of lenses or may include any number of groups of lenses.

Focus ring 114 is provided on the exterior of interchangeable lens 101. When focus ring 114 is operated by the user, information about the amount of the operation performed on focus ring 114 is notified to lens controller 120. Lens controller 120 allows focus lens driver 111 to drive focus lens 110, based on the notified information about the amount of the operation performed on focus ring 114. Hence, lens controller 120 recognizes the position of focus lens 110.

Focus lens driver 111 drives focus lens 110 to move back and forth along the optical axis of the optical system, based on control of lens controller 120. Focus lens driver 111 can be implemented by, for example, a stepping motor, a DC motor, an ultrasonic motor, or the like.

[2-3. Description of Terms]

CMOS image sensor 150 is an example of an imaging unit. Operating unit 170 is an example of an operating unit. Liquid crystal monitor 163 is an example of a display unit. In addition, liquid crystal monitor 163 is an example of an output unit. Camera controller 153 is an example of a controller.

[3. Operation]

Figure 2:
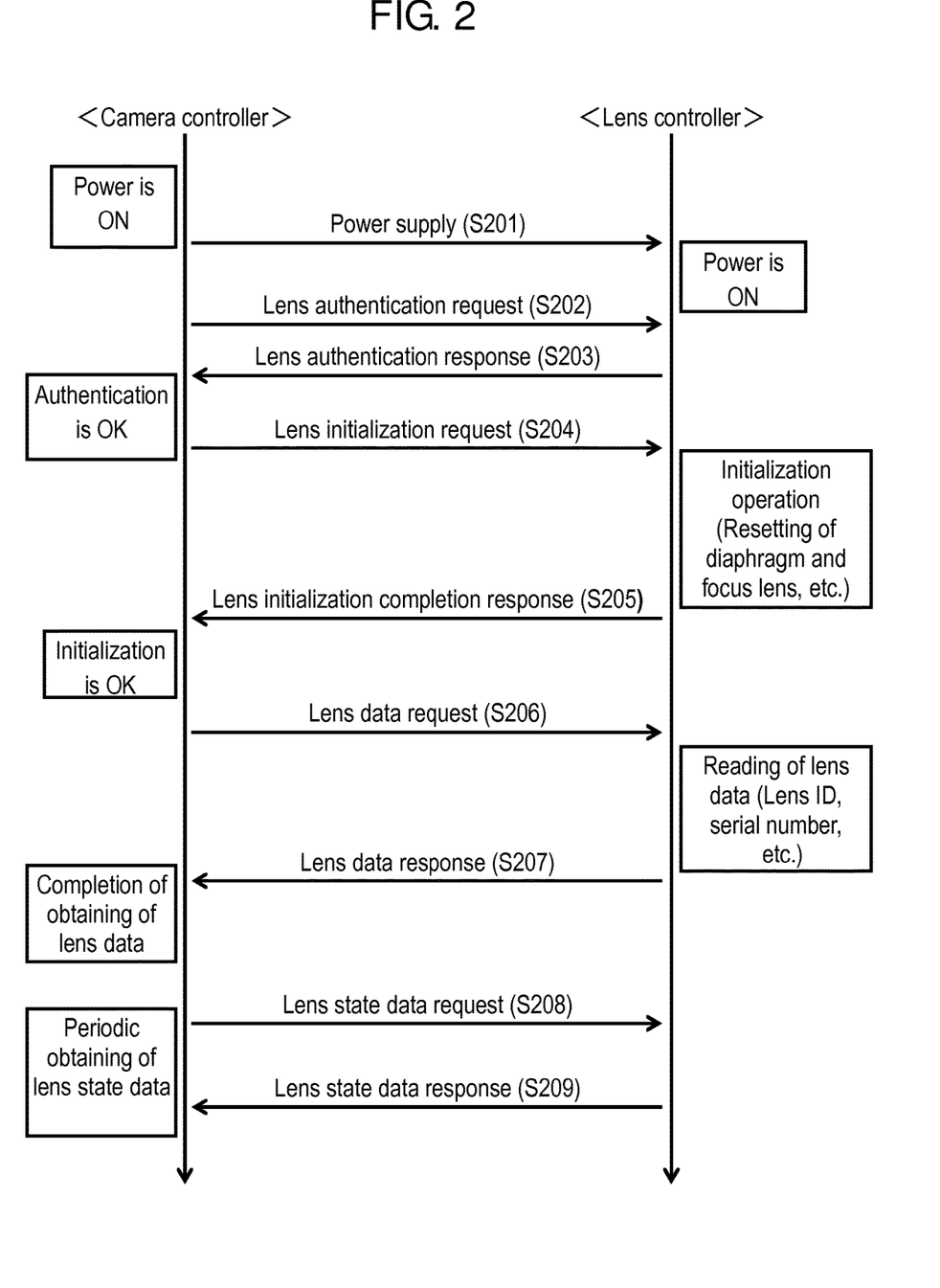
FIG. 2 is a sequence diagram showing the initial setting operation of digital camera 100.
Figure 3:
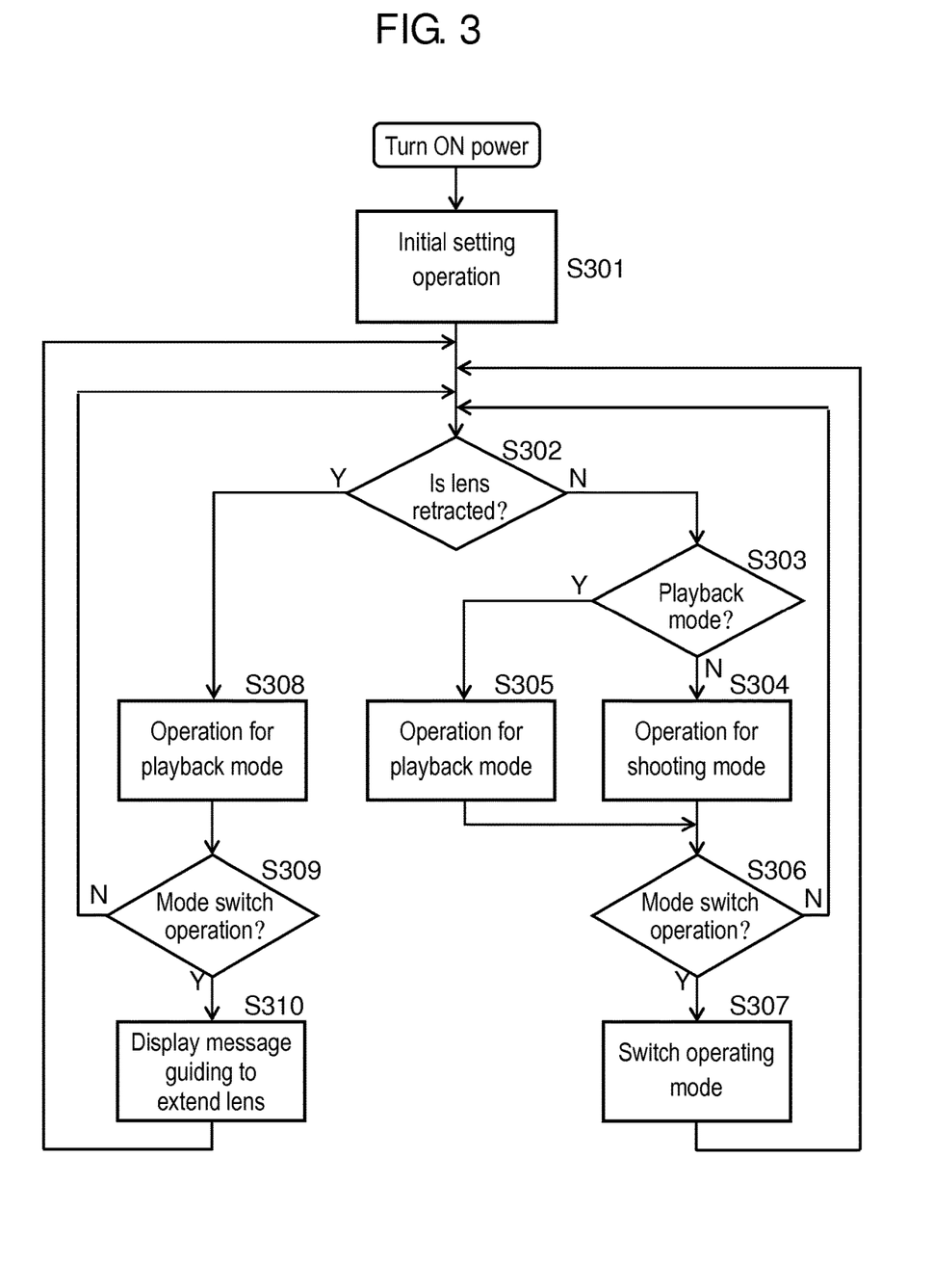
FIG. 3 is a flowchart for describing the operating mode transition control of digital camera 100.
Figure 4:
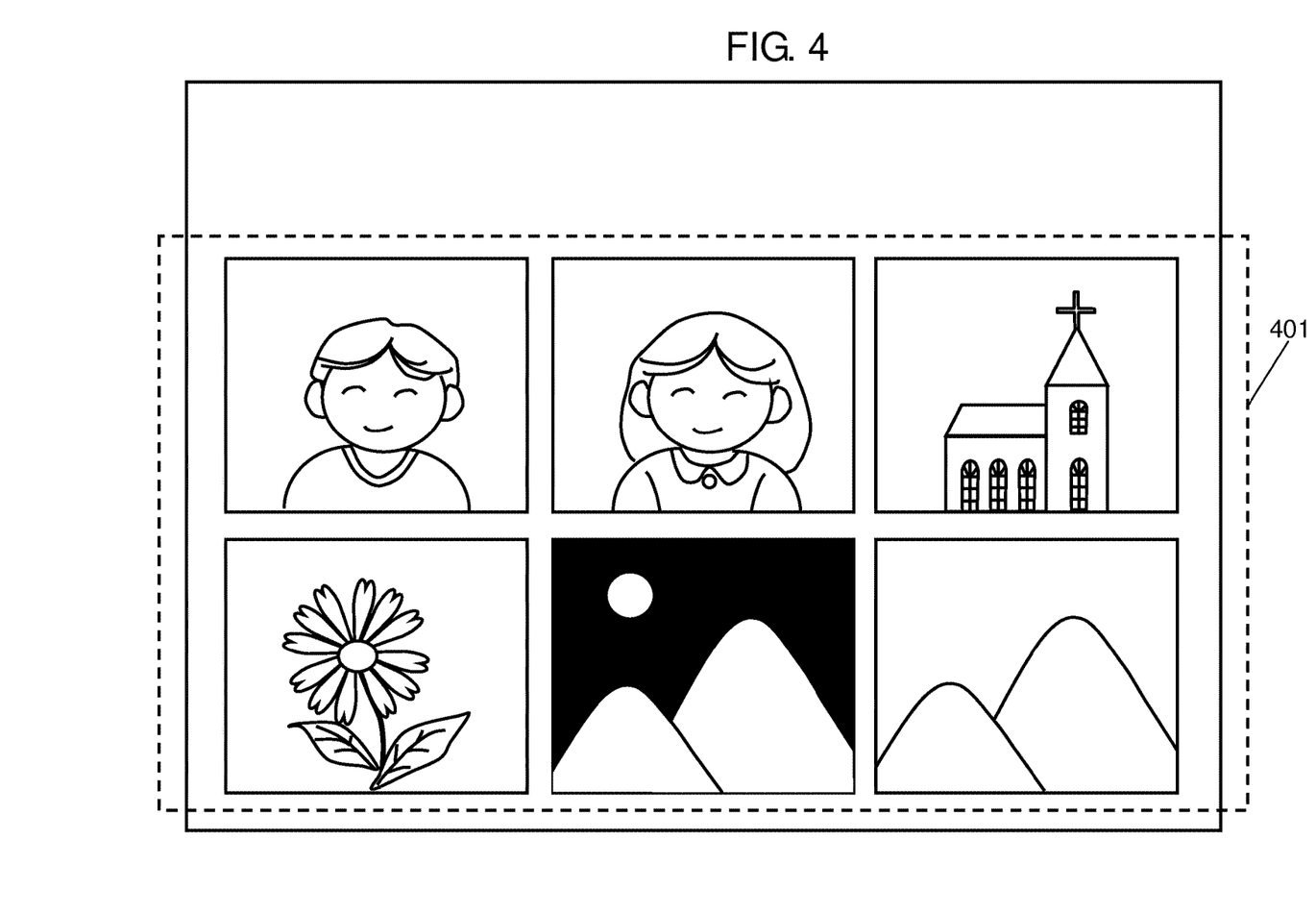
FIG. 4 is a schematic diagram for describing an example of a screen displayed on digital camera 100.
Figure 5:
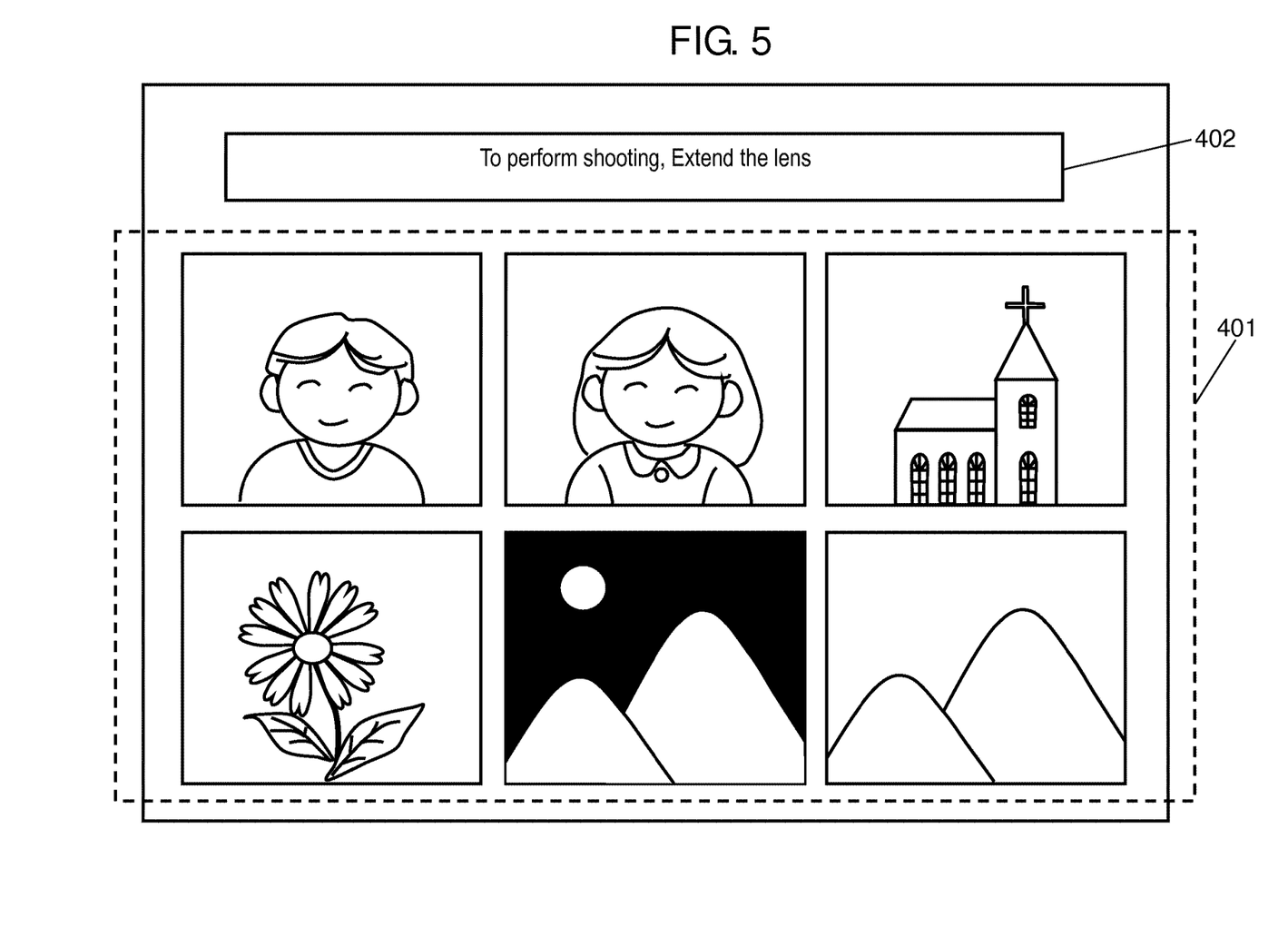
FIG. 5 is a schematic diagram for describing an example of a screen displayed on digital camera 100.

The operation of digital camera 100 will be described with reference to FIGS. 2 to 5. FIG. 2 is a sequence diagram showing the initial setting operation of digital camera 100. FIG. 3 is a flowchart for describing the operating mode transition control of digital camera 100. FIG. 4 is a schematic diagram for describing an example of a screen displayed on digital camera 100. FIG. 5 is a schematic diagram for describing an example of a screen displayed on digital camera 100.

[3-1. Initial Setting Operation]

The initial setting operation of digital camera 100 for shooting preparation will be described with reference to FIG. 2. This operation is performed first when the power to digital camera 100 is turned on.

When the user turns on the power to camera body 102 by operating power switch 152 with interchangeable lens 101 attached to camera body 102, power supply 154 supplies power to interchangeable lens 101 through body mount 140 and lens mount 130 (S201). By this, interchangeable lens 101 goes into a power-on state. Then, camera controller 153 requests lens controller 120 for authentication information of interchangeable lens 101 (S202). Here, the authentication information of interchangeable lens 101 includes information about whether interchangeable lens 101 is attached and information about whether accessories are attached. Lens controller 120 responds to the lens authentication request from camera controller 153 (S203). By this, camera controller 153 completes the lens authentication and can thereby grasp whether interchangeable lens 101 is attached to camera body 102 and whether accessories such as a teleconverter lens and a wide-converter lens are attached.

Then, camera controller 153 requests lens controller 120 to perform initialization operation (S204). In response to this, lens controller 120 performs initialization operation such as resetting of a diaphragm (not shown) and resetting of focus lens 110. Here, the resetting of the diaphragm is performed by setting the iris value to a predetermined initial value. The resetting of focus lens 110 is performed by allowing focus lens 110 to move to a predetermined initial position.

Then, lens controller 120 sends camera controller 153 a response indicating that the lens initialization operation has been completed (S205). By this, camera controller 153 can grasp that the lens has been initialized.

Subsequently, camera controller 153 requests lens controller 120 for the aforementioned lens data (S206). The lens data is stored in flash memory 122. Lens controller 120 reads the lens data from flash memory 122 and sends, as a response, the lens data to camera controller 153 (S207). Camera controller 153 stores the obtained lens data in flash memory 156.

When camera controller 153 has completed the obtaining of the lens data, digital camera 100 completes the initial setting operation. In this state, camera controller 153 periodically requests lens controller 120 for lens state data indicating the state of interchangeable lens 101 (S208). The lens state data includes, for example, the zoom magnification information of zoom lens 112, the positional information of zoom lens 112, the positional information of focus lens 110, iris value information, and ready-to-shoot information indicating whether interchangeable lens 101 is in a retracted state or a ready-to-shoot state. In response to this request, lens controller 120 sends, as a response, the requested lens state data to camera controller 153 (S209).

Camera controller 153 allows DRAM 155 to store the lens state data received from lens controller 120.

[3-2. Operating Mode Transition Control]

The operating mode transition control of digital camera 100 will be described with reference to FIGS. 3 to 5.

When the power to digital camera 100 is turned on, first, the aforementioned initial setting operation (see FIG. 2) is performed (S301). By the initial setting operation, camera body 102 obtains the lens ID and serial number of interchangeable lens 101.

After the completion of the initial setting operation, camera controller 153 periodically obtains lens state data of interchangeable lens 101. Camera controller 153 determines whether zoom lens 112 is in a retracted state or a ready-to-shoot state by referring to ready-to-shoot information included in the lens state data (S302).

If it is determined that zoom lens 112 is in a ready-to-shoot state where zoom lens 112 extends (N at S302), then camera controller 153 determines whether the operating mode of camera body 102 is set to the playback mode (S303).

If it is determined that the operating mode of camera body 102 is not set to the playback mode (N at S303), then camera controller 153 controls camera body 102 to perform operation for the shooting mode (S304). Specifically, camera controller 153 allows CMOS image sensor 150 to operate by timing generator 151 and controls CMOS image sensor 150 to generate image data representing an optical image which is formed through interchangeable lens 101. Then, camera controller 153 controls CMOS image sensor 150 to input the generated image data to image processor 172. Then, camera controller 153 controls image processor 172 to convert the inputted image data into a through-image. Then, camera controller 153 controls liquid crystal monitor 163 to display the through-image created by image processor 172.

On the other hand, if it is determined at step S303 that the operating mode of camera body 102 is the playback mode (Y at S303), then camera controller 153 performs operation for the playback mode (S305). Specifically, camera controller 153 reads image data stored in memory card 164. Then, camera controller 153 controls image processor 172 to convert the read image data into display images. Then, camera controller 153 controls liquid crystal monitor 163 to display the converted display images. For example, camera controller 153 controls liquid crystal monitor 163 to display display images such as those shown in FIG. 4. Here, the display images shown in FIG. 4 include playback images 401.

When the process at step S304 or S305 has been completed, camera controller 153 determines whether the mode switch button provided to operating unit 170 has been pressed (S306). If it is determined that the mode switch button has been pressed, then camera controller 153 performs control to switch the operating mode of camera body 102 (S307). Specifically, if the current operating mode is the playback mode, then the operating mode is switched to the shooting mode. If the current operating mode is the shooting mode, then the operating mode is switched to the playback mode.

If it is determined at step S306 that the mode switch button has not been pressed or when the process at step S307 has been completed, then camera controller 153 returns to step S302 and continues processing.

On the other hand, if it is determined at step S302 that zoom lens 112 is in a retracted state, then camera controller 153 sets the operating mode to the playback mode regardless of whether the operating mode of camera body 102 is set to the shooting mode or the playback mode, and performs operation for the playback mode (S308). Here, the operation for the playback mode is equivalent to the process at step S305.

Then, camera controller 153 determines whether the mode switch button provided to operating unit 170 has been pressed (S309). At this time, even if it is determined that the mode switch button has been pressed, camera controller 153 does not switch the operating mode of camera body 102 to the shooting mode. This is because, as described above, when zoom lens 112 is in a retracted state, digital camera 100 cannot shoot a subject. Hence, if camera controller 153 determines that the mode switch button has been pressed (Y at S309), then camera controller 153 controls liquid crystal monitor 163 to display a screen such as that shown in FIG. 5 (S310). Here, the screen shown in FIG. 5 contains message 402. Message 402 is a message guiding the user to rotate zoom ring 115 to extend zoom lens 112. In the process at step S310, specifically, camera controller 153 controls image processor 172 to create a screen containing message 402. Then, camera controller 153 controls liquid crystal monitor 163 to display, as shown in FIG. 5, playback images 401 and message 402 for a certain period of time. Message 402 is, for example, the message "To perform shooting, extend the lens". By reading message 402, the user can recognize the reason why the operating mode is not switched in spite of the attempt by the user to switch the operating mode to the shooting mode, and a method for transitioning to the shooting mode. In addition, at this time, the operation for the playback mode continues and thus the operation of camera body 102 for the playback mode is not interrupted.

If it is determined at step S309 that the mode switch button has not been pressed (N at S309) or when the process at step S310 has been completed, then camera controller 153 returns to step S302 and continues processing.

[4. Effects, Etc.]

As described above, digital camera 100 according to the present embodiment includes CMOS image sensor 150, operating unit 170, liquid crystal monitor 163, and camera controller 153. CMOS image sensor 150 captures light which is formed into an image through interchangeable lens 101 capable of housing a lens with operating force by a user. Operating unit 170 is operated by the user. Liquid crystal monitor 163 displays an image. Camera controller 153 is capable of setting digital camera 100 to a playback mode which is an operating mode to display on liquid crystal monitor 163 an image represented by image data stored in memory card 164, and an operating mode other than the playback mode. When the lens in interchangeable lens 101 is housed, camera controller 153 sets digital camera 100 to the playback mode regardless of whether or not operation to set the playback mode has been accepted through operating unit 170.

By this, when a lens in interchangeable lens 101 capable of housing the lens by a force controlled by the user is housed, digital camera 100 can display images stored in memory card 164 to the user.

In addition, when the lens in interchangeable lens 101 is housed, in response to the acceptance of operation to set the operating mode other than the playback mode through operating unit 170, camera controller 153 controls liquid crystal monitor 163 to display a message urging to extend the lens in interchangeable lens 101.

By this, digital camera 100 can allow the user to recognize a method for transitioning the operating mode to the shooting mode.

When the lens in interchangeable lens 101 extends, in response to the acceptance of operation to set the operating mode other than the playback mode through operating unit 170, camera controller 153 sets the operating mode other than the playback mode.

By this, when interchangeable lens 101 is in a ready-to-shoot state, digital camera 100 can be set to an operating mode other than the playback mode, which includes the shooting mode.

In addition, camera body 102 according to the present embodiment includes CMOS image sensor 150, operating unit 170, liquid crystal monitor 163, and camera controller 153. CMOS image sensor 150 captures light which is formed into an image through interchangeable lens 101 capable of housing a lens with operating force by a user. Operating unit 170 is operated by the user. Liquid crystal monitor 163 displays an image. Camera controller 153 is capable of setting digital camera 100 to a playback mode which is an operating mode to display on liquid crystal monitor 163 an image represented by image data stored in memory card 164, and an operating mode other than the playback mode. When the lens in interchangeable lens 101 is housed, camera controller 153 sets digital camera 100 to the playback mode regardless of whether or not operation to set the playback mode has been accepted through operating unit 170.

By this, when a lens in interchangeable lens 101 capable of housing the lens with operating force by the user is housed, camera body 102 can display images stored in memory card 164 to the user.

In addition, a method for controlling digital camera 100 according to the present embodiment is a method for controlling digital camera 100 that includes CMOS image sensor 150 capturing light which is formed into an image through interchangeable lens 101 capable of housing a lens with operating force by a user; operating unit 170 operated by the user; and liquid crystal monitor 163 displaying an image, and that can be set to a playback mode which is an operating mode to display on liquid crystal monitor 163 an image represented by image data stored in memory card 164, and an operating mode other than the playback mode. In the method for controlling digital camera 100, when the lens in interchangeable lens 101 is housed, the operating mode of digital camera 100 is set to the playback mode regardless of whether or not operation to set the playback mode has been accepted through operating unit 170.

By this, in the method for controlling digital camera 100, when a lens in interchangeable lens 101 capable of housing the lens with operating force by the user is housed, images stored in memory card 164 can be displayed to the user.

(Other Embodiments)

As described above, as exemplification of the technique disclosed in the present application, the first embodiment is described. However, the technique in the present disclosure is not limited thereto and can also be applied to embodiments where changes, substitutions, additions, omissions, etc., are made appropriately.

Now, other embodiments are exemplified below.

In the first embodiment, an example is described in which when the power to camera body 102 is turned on with interchangeable lens 101 attached to camera body 102, initial setting operation is performed and subsequently operating mode setting operation is performed. However, the timings of initial setting operation and subsequent operating mode setting operation are not limited thereto. For example, when, in a state in which an interchangeable lens is not attached to camera body 102 and the power to camera body 102 is on, interchangeable lens 101 is attached to camera body 102, the attachment of interchangeable lens 101 may be detected and then initial setting operation and operating mode setting operation such as those described in the first embodiment may be performed.

In addition, in the first embodiment, a configuration is described in which when the user performs operation to switch the operating mode to the shooting mode with interchangeable lens 101 being in a retracted state, message 402 guiding to bring interchangeable lens 101 to a ready-to-shoot state is displayed for a certain period of time. However, when interchangeable lens 101 is in a retracted state, camera body 102 may display message 402 at all times.

In addition, in the first embodiment, a configuration is described in which when interchangeable lens 101 is in a retracted state, message 402 guiding to bring interchangeable lens 101 to a ready-to-shoot state is displayed in text. However, the message may be in the form of an icon of a picture or a shape, etc., or may be one that provides an animation effect. Alternatively, the configuration may be such that audio guiding to bring interchangeable lens 101 to a ready-to-shoot state is outputted, instead of displaying message 402 on liquid crystal monitor 163 or along with displaying message 402 on liquid crystal monitor 163. In this case, camera body 102 includes a speaker that outputs audio. Note that the speaker is an example of an output unit.

In addition, in the first embodiment, a configuration is described in which when the state of interchangeable lens 101 has transitioned from a retracted state to a ready-to-shoot state, instead of the operating mode transitioning to the shooting mode according to the state transition, the operating mode is switched to the shooting mode by user operation of the mode switch button. However, the configuration of the imaging device is not limited thereto. Specifically, when the state of interchangeable lens 101 has transitioned from a retracted state to a ready-to-shoot state, camera controller 153 may control camera body 102 to transition the operating mode to the shooting mode.

In addition, in the first embodiment, a camera system composed of interchangeable lens 101 and camera body 102 is described as an example. However, the configuration of the imaging device is not limited thereto. Specifically, the technique in the present disclosure can be applied even to a digital camera in which a lens and a camera body are integrated. In this case, although interchangeable lens 101 of the first embodiment is replaced by a lens barrel fixed to the digital camera, other configurations and operation are the same as those in the first embodiment.

As described above, as exemplification of the technique in the present disclosure, embodiments are described. To do so, the accompanying drawings and a detailed description are provided.

Therefore, the components described in the accompanying drawings and the detailed description may include not only components necessary to solve the problem, but also components not necessary to solve the problem, to exemplify the above-described technique. Hence, just because those unnecessary components are described in the accompanying drawings and the detailed description it should not be immediately recognized that those unnecessary components are necessary.

In addition, since the above-described embodiments are provided to exemplify the technique in the present disclosure, various changes, substitutions, additions, omissions, etc., which come within the scope of the claims or the range of equivalency of the claims may be made.

What is claimed is:

1. An imaging device comprising:
   an imaging unit that captures light formed into an image through an optical system, the optical system being configured such that a user manually houses a lens with operating force by the user;
   an operating unit operated by the user;
   a display unit that displays an image; and
   a controller for determining whether the lens is housed or is in a ready-to-shoot state and for setting a playback mode and an operating mode other than the playback mode, wherein:
   the controller (i) sets the playback mode and executes the playback mode when the controller determines that the operating mode other than the playback mode has been set and that the lens is housed, and (ii) executes the playback mode when the controller determines that the playback mode has been set and that the lens is in the ready-to-shoot state, the playback mode being an operating mode to display on the display unit an image represented by image data stored in a storage medium.

2. The imaging device according to claim 1, wherein when the lens is housed, in response to a user operation to set the operating mode other than the playback mode through the operating unit, the controller allows the display unit to display an image urging to extend the lens.

3. The imaging device according to claim 2, further comprising an output unit that outputs information,
   wherein when the lens is housed, in response to the user operation to set the operating mode other than the playback mode through the operating unit, the controller allows the output unit to output information urging to extend the lens.

4. The imaging device according to claim 1, further comprising an output unit that outputs information,
   wherein when the lens is housed, in response to a user operation to set the operating mode other than the playback mode through the operating unit, the controller allows the output unit to output information urging to extend the lens.

5. The imaging device according to claim 1, wherein when the lens extends, in response to a user operation to set the operating mode other than the playback mode through the operating unit, the controller sets the operating mode other than the playback mode.

6. The imaging device according to claim 1, wherein when the lens is housed, the imaging unit does not form an image.

7. A camera body comprising:
- an imaging unit that captures light formed into an image through an interchangeable lens, the interchangeable lens being configured such that a user manually houses a lens with operating force by the user;
- an operating unit operated by the user;
- a display unit that displays an image; and
- a controller for determining whether the lens is housed or is in a ready-to-shoot state and for setting a playback mode and an operating mode other than the playback mode, wherein:
- the controller (i) sets the playback mode and executes the playback mode when the controller determines that the operating mode other than the playback mode has been set and that the lens in the interchangeable lens is housed, and (ii) executes the playback mode when the controller determines the playback mode has been set and that the lens is in the ready-to-shoot state, the playback mode being an operating mode to display on the display unit an image represented by image data stored in a storage medium.

8. The camera body according to claim 7, wherein when the lens is housed, the imagine unit does not form an image.

9. A method for controlling an imaging device that comprises: an imaging unit capturing light, the light being formed into an image through an optical system, the optical system being configured such that a user manually houses a lens with operating force by the user; an operating unit operated by the user; and a display unit displaying an image, and that can be set to a playback mode and an operating mode other than the playback mode, the playback mode being an operating mode to display on the display unit an image represented by image data stored in a storage medium, the method comprising:
- determining whether the lens is housed or is in a ready-to-shoot state;
- setting and executing the playback mode when it is determined that the operating mode other than the playback mode has been set and that the lens is housed; and
- executing the playback mode when it is determined that the playback mode has been set and that the lens is in the ready-to-shoot state.

\* \* \* \* \*